United States Patent Office.

ST. GEORGE T. C. BRYAN, OF BIRMINGHAM, ALABAMA.

METHOD OF MECHANICALLY TREATING AND ANNEALING SLAG.

SPECIFICATION forming part of Letters Patent No. 400,046, dated March 26, 1889.

Application filed April 24, 1888. Serial No. 271,697. (No specimens.)

*To all whom it may concern:*

Be it known that I, ST. GEORGE T. C. BRYAN, of Birmingham, in the county of Jefferson and State of Alabama, have invented a certain new and useful Method of Mechanically Treating and Annealing Slag, of which the following is a specification.

The object of my invention, stated generally, is to prepare slag (which is now chiefly a waste product of iron-furnaces, &c., and troublesome to get rid of) for a variety of important uses to which it has never before been capable of being applied.

Accordingly, my invention consists in a peculiar treatment of slag, which is essentially a process of annealing, and which I particularly describe below.

Slags are never uniform in composition and temperature, as they come from different furnaces and are largely admixed with gases, fumes, and both solid and liquid matter. The presence of these foreign substances and the absence of homogeneous composition and uniform temperature unfit them for general use, because of the impossibility of satisfactorily annealing them, which demands a temperature substantially uniform throughout the mass and the absence of foreign matter during the processes of annealing.

To practice my process of treating slag I deliver it in a molten state as it flows from the furnace into a pot or other suitable receptacle, where I cause it to be agitated either by stirring or by revolving the vessel containing the molten slag, so as to give it a rotary motion, which is preferable. By this means I eliminate all gases and fumes and gas and fume producing matter, and all the unmolten and molten foreign matter is collected through centrifugal force and gravity and then removed, and by continued agitation or stirring a homogeneous mass of molten slag of uniform temperature is secured, which conditions, as above stated, are essential to proper annealing. Rotary motion of the molten slag assisted by gravity will cause the gases, coke, and clay, and all the lighter substances, whether molten or not, to rise to the surface, where the gases will escape and the solids can be readily removed. Under the influence of this motion the slag, because of its superior density, will press toward the walls of the vessel. The molten iron or other heavier substance will quickly sink to the bottom of the vessel, and can be drawn off in the usual manner. The result is that the combinations of lime, silica, alumina, and whatever particles of iron remain in the slag, will be such that the slag will be substantially uniform and homogeneous in texture, quality, &c., throughout its mass. This first step in the annealing process is followed by running the purified homogeneous slag into molds having their inner surfaces covered with asbestus, or a mixture of asbestus, plumbago, clay, soapstone, and coal-tar, using one or more of these with the asbestus, as I may elect. When practicable, instead of using metal or other material for making molds, I use asbestus in its fibrous state, or such a mixture of asbestus with plumbago, &c., as I have described, and molds can readily be fabricated from these substances. Such molds prevent a too rapid dissipation of heat and secure a gradual cooling of the slag essential to its annealing. In fact, the deposition of the molten slag into molds composed in whole or in part of asbestus is an annealing or part of an annealing process in itself, for the reason that the molds prevent the rapid conduction, convection, and radiation of heat, and cause the mass to gradually cool throughout with substantial uniformity, which is essential to the best results in annealing. As soon as the surfaces of the slag in the molds become sufficiently set to admit of removal, the slag may be taken out and immediately placed in an ordinary annealing-oven. Where there is not room on the furnace-grounds for the construction of annealing-chambers near to the mixing-pot, they may be constructed at a reasonable distance and the molds adjacent to them, or, when desired, the molds may be built or set up within the annealing-chambers. In such case the mixing pot or receptacle may be mounted on a truck, and, when filled with the molten slag from the furnace, drawn to the annealing-chamber and the molten slag discharged from it into the mold. The initial heat of the slag is such that it will be practicable to convey it in suitable receptacles a considerable distance without causing such a reduction in temperature as to interfere with the successful practice of my improved method of annealing.

It will save one handling of the slag to build the asbestus or asbestus-composition molds within or connected with the annealing-chamber.

By these three steps—to wit, first, the agitation and purification of the slag as it comes from the furnace in a molten condition; second, the delivering it, when purified and of substantially uniform temperature, specific heat, latent heat, melting and fusion points, and heat-conducting capacity, into asbestus or asbestus-composition molds, or molds lined with the same, which will prevent too rapid loss of heat; and, third, the ordinary process of annealing in an annealing-chamber—I secure a tough, enduring, and valuable slag product, which may be used for building purposes and various other objects; but that part of my invention which consists in purifying the slag by agitation, preferably rotation, is of itself a complete and valuable improvement, for the reason that it brings slag to such a condition that it is without defects of porosity, brittleness, impurity, and heterogeneity, which render ordinary slag useless for most purposes. It will now be understood, therefore, that my invention consists in a process of purifying slag and rendering it more dense, tenacious, and homogeneous than it is as it comes in mass from furnaces.

In connection with this purification of slag the further treatment I have described becomes practicable and highly useful to produce durable forms of slag for divers uses.

What I claim to be new, and desire to secure by Letters Patent of the United States, is—

1. The herein-described process of treating slag mechanically by rotation in a suitable vessel when in a molten state, so as to separate impurities from it through the action of gravity and centrifugal force, and after the removal of such impurities stirring the slag, so as to make the mass practically homogeneous and of uniform temperature and quality, substantially as set forth.

2. The herein-described process of treating slag mechanically by rotation in a suitable vessel when in a molten state, so as to separate impurities from it through the action of gravity and centrifugal force, and after the removal of such impurities stirring the slag, so as to make the mass homogeneous and of uniform temperature and quality, then depositing it in slow-cooling molds for further annealing and toughening it, substantially as set forth.

In testimony of all which I have hereunto subscribed my name.

ST. GEORGE T. C. BRYAN.

Witnesses:
O. W. UNDERWOOD,
C. B. HALL.